Oct. 19, 1948.  C. E. TORSCH  2,451,641
POWER CONSERVATION SYSTEM
Filed Sept. 28, 1945
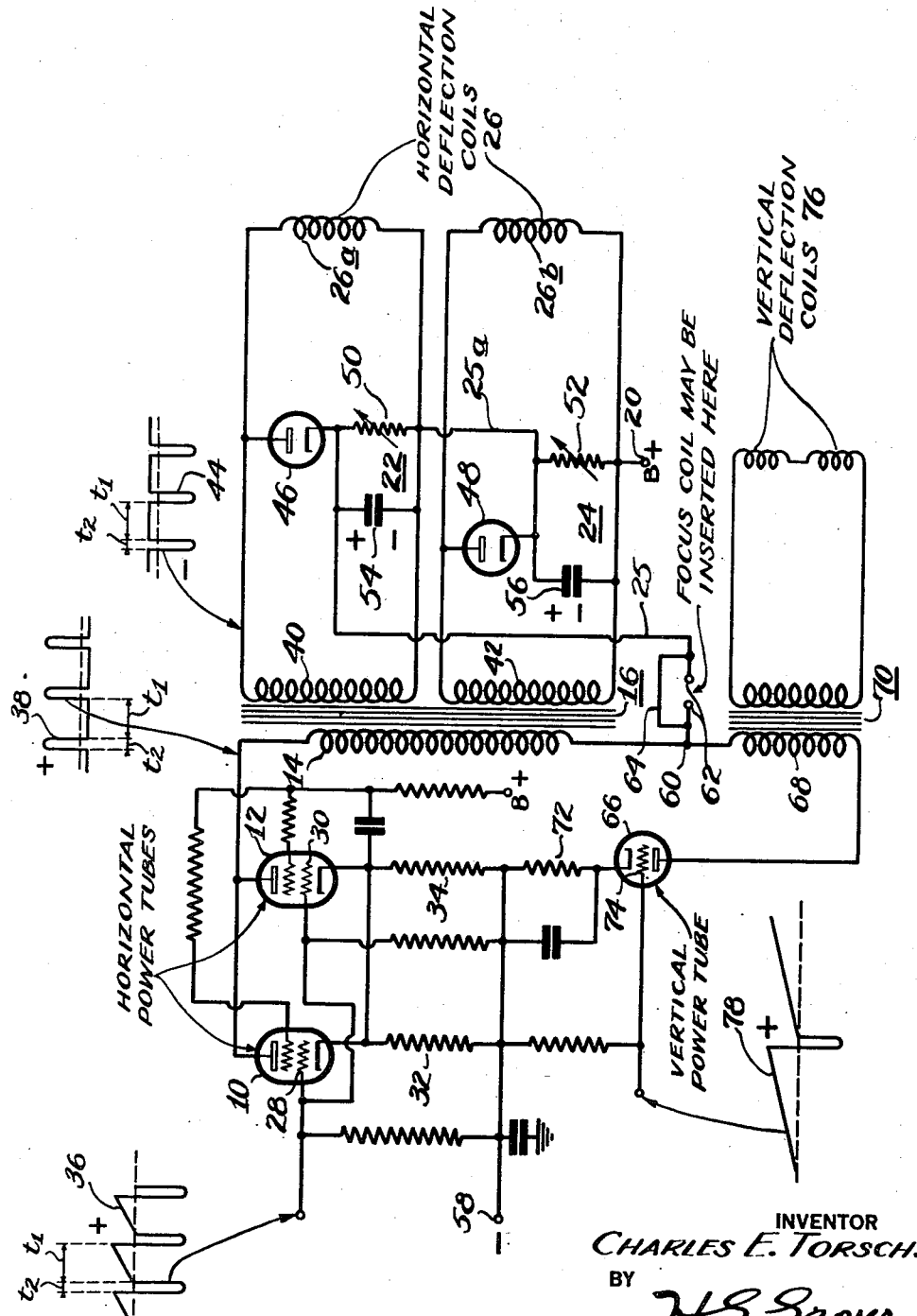
INVENTOR
CHARLES E. TORSCH.
BY
H. S. Grover.
ATTORNEY Patented Oct. 19, 1948

2,451,641

UNITED STATES PATENT OFFICE 2,451,641

POWER CONSERVATION SYSTEM

Charles Edward Torsch, Lancaster Township, Lancaster County, Pa., assignor to Radio Corporation of America, a corporation of Delaware Application September 28, 1945, Serial No. 619,176

11 Claims. (Cl. 315—27)

The present invention relates to cathode ray beam deflection circuits, especially of the type employed in television transmitting and receiving systems, as well as oscillographic devices. More particularly, the invention relates to means for reclaiming a portion of the cyclic reactive energy which is developed in such circuits, and which in most prior art systems was usually dissipated without being gainfully utilized.

The present application constitutes a further development of the invention disclosed in my copending application for U. S. Letters Patent, Serial No. 610,368, filed August 11, 1945. In this copending application, as well as in a further copending application for U. S. Letters Patent of Otto H. Schade, Serial No. 593,161, filed May 11, 1945, there is considered the problem of raising the efficiency of utilization of the input power in a reactive load circuit, especially in a line, or horizontal, cathode ray beam deflection circuit of the type used in television systems. The solution disclosed in each of these copending applications includes rectification of the cyclic reactive energy developed in the load circuit, and the storing of this reactive energy to establish a relatively steady D. C. potential. The steady D. C. potential thus established may, if desired, be applied in series with the source of D. C. input voltage to raise the amount of useful power which is made available in the load circuit.

In a power conservation, or "boosting," system of this nature, the efficiency of the circuit depends upon the percentage of the D. C. power input which can be recovered and stored for the purpose of recirculation. This is obvious, since the greater the value of the recovered energy, the higher will be the ratio of power output to power input.

In both copending applications above referred to, the cyclic reactive energy developed in the load circuit is rectified and applied to an energy storage device to build up a relatively smooth D. C. potential thereon. This rectifying means in the Schade disclosure is a controlled inverter tube, or triode damper, connected in series with the energy storage device. The series combination of triode and energy storage device is then shunted across the reactive portion of the load circuit, such as the cathode ray beam deflection coil.

In applicant's copending application, it is brought out that the voltage developed across the inductive portion of the output circuit, such as the cathode ray beam deflection coil, may be represented mathematically as $$L \cdot \frac{di}{dt}$$

where L represents the inductance of the coil and $$\frac{di}{dt}$$

is the differential representing the rate of change of current flow through the coil with respect to time. This inductive voltage $$L \cdot \frac{di}{dt}$$

is approximately equal to the sum of the condenser voltage (where the energy storage device comprises a condenser), the triode damper voltage drop, and the voltage drop due to the distributed circuit resistance.

In order to develop a maximum condenser voltage or, in other words, in order to reclaim a maximum amount of the cyclic reactive energy, the other two factors present, namely, the triode damper voltage drop and the voltage drop due to the distributed circuit resistance, must be kept at a minimum. The latter, however, is a relatively fixed quantity.

The invention of applicant's copending application, accordingly, includes means for raising the voltage developed on the energy storage element of "booster" circuits of the type mentioned by replacing the triode damper tube (as in the copending Schade application) with a rectifier across which there is a smaller voltage drop. Since the internal resistance of a diode is normally considerably less than that of a grid-controlled tube, the use of a two-element tube satisfies this requirement. Furthermore, a diode is lower in cost than triodes having satisfactory operating characteristics.

It has been found, however, that a power recovery system using a diode rectifier in the manner set forth in applicant's copending application permits the peak deflecting current for the cathode ray beam to be increased to such an extent that the rating of the rectifier tube is frequently exceeded, either in peak inverse voltage or in peak current passed. While overloading of a single diode rectifier may be overcome in some cases by employing two tubes in parallel, the power reclaimed by such an expedient is not much, if any, greater than that obtained through the use of a single tube alone.

The present invention contemplates the employment of two diode rectifier tubes, not in parallel as mentioned above, but instead so arranged that each diode is respectively connected across one of the two horizontal cathode ray beam deflection coils. These horizontal cathode ray beam deflection coils, normally forming part of the yoke assembly encircling the neck of a cathode ray tube, are not connected together in series as is usually the case. Instead, each coil is supplied with current from a separate secondary winding on the same horizontal output transformer.

Under the above conditions, the energy storage device in series with each diode rectifier is charged to a level determined by the voltage developed across that particular portion of the entire transformer secondary winding. When the two energy storage devices are connected to the anode of the horizontal power tube or tubes in series both with each other and with the source of input voltage, the amount of energy recovered and available for recirculation will be approximately equal to the sum of the voltages appearing on the individual energy storage devices. The energy rectified by each diode, however, will be only substantially half of this total recovered power, so that tubes with relatively low ratings may be employed. The individual energy storage devices likewise may be of a much smaller rated capacity than that required of a single such energy storage device in applicant's copending application, assuming equal amounts of total recovered power.

One object of the present invention, therefore, is to provide means for reclaiming a maximum percentage of the power normally wasted in cyclic reactive load circuits.

Another object of the invention is to provide means for utilizing a pair of rectifiers each of which is adapted to rectify a portion of the total cyclic reactive energy developed in the load circuit, and further means whereby each portion of the total cyclic reactive energy thus rectified is separately stored to develop separate relatively smooth D. C. potentials.

A further object of the invention is to apply the separate relatively smooth D. C. potentials thus stored so as to make available for recirculation in the load circuit an amount of energy substantially equivalent to the sum of these separate relatively smooth D. C. potentials.

A still further object of the invention is to provide a cathode ray beam deflection circuit of the electro-magnetic type, in which the reactive energy developed across each of a pair of horizontal, or line, cathode ray beam deflection coils during the retrace periods of the cathode ray beam is separately rectified and stored to develop separate relatively smooth D. C. potentials, these separate D. C. potentials then being added together and their sum applied so as to increase the amount of power available for recirculation through the cathode ray beam deflection coils.

Other objects and advantages will be apparent from the following description and from the drawing, the single figure of which is a circuit diagram illustrating a preferred embodiment of the present invention.

In the drawing is shown a cathode ray beam deflection circuit as used in television transmitting and receiving systems, in which a cathode ray scanning beam is caused to scan each line of an image raster at a relatively slow rate, followed by a rapid snap-back, or retrace, of the cathode ray beam to a point at the beginning of the next scanning line. The illustrated circuit includes a pair of substantially like characteristics parallel-connected horizontal, or line, power output tubes 10 and 12, each of which may, for example, be of the type known as the 807. Power tubes 10 and 12 each include at least a cathode, a control electrode, a screen electrode, and an anode. The corresponding elements of power tubes 10 and 12 are joined together, that is, the cathode of tube 10 is connected to the cathode of tube 12, while the control electrodes, screen electrodes, and anodes of the two tubes are similarly connected.

The joined anodes of power tubes 10 and 12 are connected to one end of the primary winding 14 of a step-down coupling, or horizontal output, transformer 16. The other end of primary winding 14 of transformer 16 is connected to the positive terminal 20 of a suitable source of potential (not shown) through two parallel resistance-condenser combinations 22 and 24, these two resistance-condenser combinations, or time constant circuits, 22 and 24 being serially connected between transformer winding 14 and source terminal 20 by means including two leads 25 and 25a, as illustrated. Power tubes 10 and 12 are adapted to supply cyclically varying current, in a manner to be later described, through transformer 16 to a pair of horizontal, or line, cathode ray beam deflection coils 26.

A negative bias is produced on the control electrodes 28 and 30 of power tubes 10 and 12, respectively, during operation of the system by means of cathode-biasing resistors 32 and 34, respectively. Since the screen currents of the power tubes 10 and 12 also flow through resistors 32 and 34, respectively, the negative bias produced on the control electrodes 28 and 30 is proportional to the combined screen grid and anode current and, hence, varies during each scanning cycle.

Voltage variations, the waveform of which may be such as indicated by the reference character 36, are applied to the control electrodes 28 and 30 of power tubes 10 and 12, respectively. These voltage variations 36 have linearly rising positive portions during the cathode ray beam scanning intervals, denoted by the symbol $t_1$, followed by sharp negative excursions during retrace intervals, denoted by the symbol $t_2$. As a result of this controlled operation of tubes 10 and 12, voltage variations, which may be such as indicated by the waveform 38, are caused to appear across the primary winding 14 of transformer 16. These voltage variations 38 comprise periods of relatively constant negative voltage during the scanning intervals $t_1$, and sharp positive pulses during the retrace intervals $t_2$.

The secondary of coupling transformer 16 consists of two windings 40 and 42, each of which is wound in a direction opposite to that of the primary winding 14, and each of which preferably has the same number of turns. Consequently, when the upper end (in the drawing) of the primary winding 14 is positive, the upper end (in the drawing) of the secondary winding 40 is negative. This causes the waveform 44 of the voltage appearing at the upper end of the secondary winding 40 to be reversed in polarity with respect to the voltage waveform 38 as shown. The waveform of the voltage appearing at the upper end (in the drawing) of the secondary winding 42 also corresponds in polarity to the waveform 44.

Two diode damper, or rectifier, tubes 46 and 48 are utilized in the circuit shown. Diode 46 has its anode connected to the upper end of the secondary winding 40, or in other words, to that end of the secondary winding 40 on which the negative excursions of voltage wave 44 appear during the retrace intervals $t_2$. The cathode of diode 46 is connected to that end of the parallel resistance-condenser combination 22 which is joined to the primary winding 14 of transformer 16 by means including lead 25. The anode of diode 46 is also connected to one end of one of the pair of horizontal deflection coils 26, while the other end of that particular deflection coil (designated in the drawing as 26a) is joined both to the lower end of secondary winding 40 and to that end of the parallel resistance-condenser combination 22 opposite to the end which is connected to the cathode of diode 46. It will be noted that, as a result of such connections, the series combination of diode 46 and the resistance-condenser, or time constant, circuit 22 is shunted across both the secondary winding 40 of transformer 16 and one coil 26a of the pair of horizontal deflection coils 26.

The remaining diode 48 is connected in series with the resistance-condenser combination 24, and the series combination of diode and time constant circuit is shunted across both the secondary winding 42 and the other coil 26b of the pair of deflection coils 26. The anode of diode 48 is thus connected to that end of the secondary winding 42 on which negative excursions of voltage appear during the retrace intervals $t_2$.

While the voltage variations 36 applied to the control electrodes 28 and 30 of power tubes 10 and 12, respectively, act to cut off plate current in the tubes at the beginning of retrace time $t_2$, the current in the secondary circuits of transformers 16 does not disappear instantaneously because of the inherent distributed capacity across the secondary windings 40 and 42 (both directly on the secondary and that reflected through the transformer from the primary) and across the deflection coils 26. This distributed capacity is, at the beginning of retrace interval $t_2$, charged to a relatively low voltage.

The inductance of these elements 40, 42, and 26, together with the distributed capacity thereacross, forms a tuned circuit in which high-frequency oscillations will be produced in the absence of the diode damper tubes 46 and 48. The oscillations begin at the start of retrace interval $t_2$, and continue for substantially a half cycle of the natural period of free oscillation of the circuit. After one-quarter cycle, the current in the deflection coils 26 reverses, and the oscillation is stopped after one-half cycle near the negative current peak by reason of the diode damper tubes 46 and 48. During the retrace time $t_2$, that is, during the half cycle of the natural period of oscillation of the secondary circuit, the current in tubes 10, 12, 46 and 48 is completely blocked, the voltage across the deflection coils 26 and the transformer secondary windings 40 and 42 rising to a high peak value at one-quarter cycle when the current passes through zero. A new deflection cycle $t_1$ starts after the half cycle of free oscillation, at which time the voltage appearing across the deflection coils 26 and the transformer windings 40 and 42 is maintained substantially uniform.

The horizontal deflection coil 26a is supplied with current from the secondary winding 40. The horizontal deflection coil 26b is similarly supplied with current from the secondary winding 42. In order that linear deflection of the cathode ray beam be produced, it is necessary that the rate of change of the current flowing through each of the deflection coils 26a and 26b be maintained substantially constant during the scanning intervals $t_1$. The waveform of the voltage variations 36 applied to the control electrodes 28 and 30 of power tubes 10 and 12, respectively, as well as the bias potentials of these tubes, are such as to cause the plate currents of tubes 10 and 12 to increase after the beginning of the deflection cycle. The diodes 46 and 48, however, begin to conduct immediately following the retrace intervals $t_2$, and operate to produce decreasing plate currents which respectively supplement the currents derived from the separate secondary windings 40 and 42 to result in two deflection currents having linear summation characteristics, these two deflection currents representing those which actually flow through the horizontal deflection coils 26a and 26b, respectively.

The bias on each of the damper tubes 46 and 48 is a factor in determining the rate of current flow through the tubes. This rate of current flow is selected so as to combine with the currents derived from across the secondary windings 40 and 42 to result in a linear rate of change of current through the deflection coils 26a and 26b, respectively. Consequently, adjustment of the bias on diodes 46 and 48 has the effect of a linearity control.

The diode bias-adjusting means shown in the drawing comprises means for varying the values of resistors 50 and 52, respectively, forming parts of the resistance-condenser combinations 22 and 24. Since diodes 46 and 48 are, in effect, rectifiers, currents flowing through diodes 46 and 48 and their respective resistance-condenser combinations 22 and 24 cause charges to be built up on the respective condensers 54 and 56 of the combinations. The upper plate (in the drawing) of each of condensers 54 and 56 will be of positive potential.

By employing a time constant for resistor 50 and condenser 54 which is selected in accordance with the recurrence frequency of the control voltage variations 36, the charge thus built up on condenser 54 may be maintained relatively constant in value. This applies as well to the charge deleveloped on condenser 56, the time constant for resistor 52 and condenser 56 being, in practice, approximately the same as the time constant for resistor 50 and condenser 54. The magnitude of the charges on condensers 54 and 56 (as well as the deflection linearity) is controlled by the adjustable resistors 50 and 52, respectively.

In accordance with the present invention, the charges developed on condensers 54 and 56 are employed to increase, or "boost," the output of the horizontal, or line, power output tubes 10 and 12 (as well as the output of the vertical, or field, deflection power tube as will be later described) by raising the potential normally applied to the anodes of tubes 10 and 12 from the supply voltage source connected to the terminal 20.

As will be seen from the drawing and as pointed out above, the anodes of power tubes 10 and 12 are connected by means including the leads 25 and 25a to the supply voltage terminal 20 through the primary winding 14 of transformer 16 in series with the two resistor-condenser combinations 22 and 24. The voltages developed on both the condenser 54 of the resistor-condenser combination 22, and on the condenser 56 of the resistance-condenser combination 24, are of such polarity as to add to the supply voltage and, hence, the actual potential appearing on the anodes of horizontal power tubes 10 and 12 is substantially the sum of the voltage connected to terminal 20 and the voltages developed on condensers 54 and 56 due to the rectifying action of the diode damper tubes 46 and 48. It is apparent that the current rise in the anode circuit of the power tubes 10 and 12 during a scanning cycle is supplied in part by a partial discharge of condensers 54 and 56, which are then respectively recharged by the diodes 46 and 48 at the start of each scanning cycle.

Under one particular set of operating conditions and with certain selected values of circuit components, approximately the following results may be obtained with the circuit illustrated, these results being set forth to illustrate the manner in which power may be recovered from the cyclic reactive energy present in a load circuit and used for the purpose of recirculation.

The cathodes of horizontal power tubes 10 and 12 are connected to the terminal 58 through the cathode biasing resistors 32 and 34, respectively. Assuming that the voltage appearing at terminal 58 is —105 volts, and that the voltage applied to terminal 20 is +280 volts, then if the primary winding 14 of transformer 16 is wound with 500 turns, and if each secondary winding 40 and 42 is wound with 150 turns, a control voltage variation 36 of a 15.75 kilocycle recurrence frequency applied to the control electrodes 28 and 30 of horizontal power tubes 10 and 12, respectively, will cause a charge of approximately +50 volts to be built up on each of condensers 54 and 56.

Since condensers 54 and 56 are in series with the source of positive supply voltage of +280 volts at terminal 20, then the voltage at point 60 which is available for application to the anodes of power tubes 10 and 12 through the transformer primary winding 14 is approximately +280 volts+(+100 volts)=+380 volts. Thus, the total anode voltage of power tubes 10 and 12 relative to their control electrodes 28 and 30, repectively, has been "boosted" from +385 volts to +485 volts, or approximately 26 per cent. Furthermore, although a total of approximately 100 volts has been recovered, each of condensers 54 and 56 handles approximately only half of this total recovered voltage. In addition, the rated values of each of diodes 46 and 48 need only be such as to produce a rectified potential of approximately 50 volts on each of condensers 54 and 56, rather than in the full 100 volts when a single rectifier tube is employed, as in applicant's copending application, for an output of similar magnitude.

Although the two diodes 46 and 48 have been described as separate tubes which may, for example, be of the type known as the 5V4, it will be obvious that, if desired, the two diodes 46 and 48 may be enclosed in a single envelope, as long as such a single envelope tube is provided with individual cathode connections.

A focus coil (not shown) for bringing to a desired focus a cathode ray beam deflected by the electromagnetic field surrounding the cathode ray beam deflection coils 26 may be inserted between the terminals 62 in the lead 25. In such case, the shorting bar 64, is omitted. Of course, the employment of such a focus coil will reduce the voltage appearing at point 60 by an amount determined by the power required to energize the coil.

In the same manner as shown in applicant's copending application above referred to, the voltage developed on condensers 54 and 56 may be employed to "boost" the output not only of the horizontal, or line, power tubes 10 and 12, but of a vertical, or field, power tube as well. Such a vertical, or field, deflection power tube 66 which may, for example, be of the type known as the 6V6 having its anode and screen grid connected together to act as a triode, has its anode joined to the positive terminal 20 of the supply source through the resistance-condenser combinations 22 and 24 and the primary winding 68 of a vertical coupling transformer 70. A cathode-biasing resistor 72 provides the proper negative operating bias on the control electrode 74 of vertical power tube 66 during operation of the system. Power tube 66 is designed to supply cyclically varying current through transformer 70 to a pair of vertical, or field, deflection coils 76 when voltage variations, which may have a waveform such as indicated by the reference character 78, are applied to the control electrode 74 thereof.

The anode of the vertical, or field, deflection power tube 66 is connected through the resistance-condenser combinations 22 and 24 to the supply voltage terminal 20 in parallel with the anodes of the horizontal, or line, power output tubes 10 and 12. Hence, the anode of the vertical power tube 66 receives the same "boosted" voltage as do the anodes of the horizontal power tubes 10 and 12, resulting in an increased power output from the vertical power tube 66 and an increase in the peak amplitude of the current flowing through the vertical deflection coils 76.

The current requirement of the vertical power tube 66 is small compared to that of the horizontal power output tubes 10 and 12, and hence less discharge of condensers 54 and 56 is occasioned during each cycle of vertical scan than during each horizontal cycle. However, a larger value of capacitance must be provided for each of capacitors 54 and 56 when supplying vertical "boost" to avoid a visible "keystoning" (or modulation) of horizontal line length during each vertical scanning cycle.

It should be noted that although in the preceding description the voltage developed on condensers 54 and 56 is employed to increase or "boost" the supply voltage to both the horizontal and vertical power output tubes so as to result in increased scanning power, nevertheless, if desired, the same output power may be maintained, with the voltage developed on condensers 54 and 56 being employed to reduce the required supply voltage approximately to the extent of the value of the total charge on the two condensers.

It should also be noted that the capacities of condensers 54 and 56 are chosen sufficiently large in the example given to feed both the horizontal power tubes 10 and 12 and the vertical power tube 66. However, if "boosted" voltage for the vertical power tube 66 is not necessary or desirable under certain operating conditions, then the anode of the vertical power tube 66 may be connected through the primary transformer winding 68 directly to the supply voltage terminal 20 or, in other words, connected to bypass the resistance-condenser combinations 22 and 24. In such an event, the condensers 54 and 56 may be reduced in capacity, as they would then supply voltage only to the horizontal power output tubes 10 and 12, at a more rapid rate of recharge repetition relative to the slowest discharge repetition.

As another alternative, the anode of vertical power tube 66 may be connected through the primary transformer winding 68 to the cathode of diode 48 or, in other words, to the lead 25a. The anode of vertical power tube 66 would then receive only the "boosted" voltage supplied by the condenser 56, or, in the example given above as an illustration, a potential of +280 volts +(+50) volts = +330 volts.

As hereinabove stated, adjustment of the resistors 50 and 52 varies the magnitude of the average charge retained on condensers 54 and 56, respectively. However, since these resistors 50 and 52 are also linearity controls, their adjustment is carried out for the purpose of obtaining a constant rate of current increase through the horizontal deflection coils 26, and hence the highest degree of linearity of deflection of the cathode ray beam.

While the damper tubes 46 and 48 have been illustrated and described as diodes, it will be appreciated that any suitable type of grid-controlled suppressor tube may readily be substituted for either or both of diodes 46 and 48 if more precise regulation of the current flow through the damper tubes is desired. The voltages for the control grids of such suppressor tubes may be developed in any suitable manner such, for example, as in the copending Schade application referred to above.

I claim:

1. In a system having a source of D.-C. power, means for converting the D.-C. power supplied by said source into A.-C. power, and an inductively reactive load circuit into which the A.-C. power output of said converting means is fed, the combination of a pair of electron discharge tubes each of which is connected to rectify a portion of the reactive energy cyclically developed in said load circuit, a pair of energy-storage devices, means for respectively applying the energy rectified by said electron discharge tubes to said energy-storage devices so as to establish substantially smooth D.-C. potentials thereon having values dependent upon the magnitude of the respective rectified energies, and a circuit for applying the D.-C. potentials established on said energy-storage devices to said converting means additively in series both with each other and with said source of D.-C. power, whereby the amount of A.-C. power available for application to said load circuit is increased.

2. In a cathode ray beam deflection circuit, a source of D.-C. power, means for converting the D.-C. power from said source into A.-C. power of a substantially predetermined frequency, a pair of cathode ray beam deflection coils each connected to receive a portion of the power output of said converting means, a pair of rectifiers, a pair of energy-storage devices respectively connected in series with said pair of rectifiers, means for connecting each series combination of rectifier and energy-storage device respectively across one of said pair of cathode ray beam deflection coils so that said rectifier will rectify a portion of the reactive energy developed across its respective cathode ray beam deflection coil, and a circuit for connecting said energy-storage devices to said converting means additively in series both with each other and with said D.-C. source.

3. A cathode ray beam deflection circuit in accordance with claim 2, in which said rectifiers are diodes.

4. In a cathode ray beam deflection circuit, a source of D.-C. potential, a transformer having a primary winding and a split secondary winding, a pair of energy storage circuits, at least one power output tube having its anode connected to the positive terminal of said source of D.-C. potential through both the primary winding of said transformer and said pair of energy storage circuits, a pair of cathode ray beam deflection coils, a pair of rectifiers, and means for connecting one of said rectifiers and one of said energy storage circuits in series across one of said cathode ray beam deflection coils and also across one portion of the split secondary winding of said transformer so that said one rectifier will rectify a portion of the reactive energy developed across said one cathode ray beam deflection coil, the remaining rectifier and the remaining energy storage circuit being connected in series across the remaining cathode ray beam deflection coil and also across the remaining portion of the split secondary winding of said transformer so that said remaining rectifier will rectify a portion of the reactive energy developed across said remaining cathode ray beam deflection coil.

5. A cathod ray beam deflection circuit in accordance with claim 4, in which each of said pair of energy storage circuits comprises a parallel resistance-condenser combination, further including means for adjusting the value of the resistance of said resistance-condenser combination to thereby vary the charge developed on said condenser.

6. In a cathode ray beam deflection system, a power tube, a source of D.-C. power therefor, a source of synchronizing voltage, means for applying a synchronizing voltage from said source to said power tube so as to produce a cyclically varying power output therefrom, a pair of horizontal cathode ray beam deflection coils each connected to receive a portion of the power output of said power tube, a pair of rectifiers, a pair of energy-storage devices respectively connected in series with said pair of rectifiers, each series combination of rectifier and energy-storage device being connected respectively across one of said pair of horizontal cathode ray beam deflection coils so that said rectifier will rectify a portion of the reactive energy developed across its respective cathode ray beam deflection coil, a second power tube adapted to receive D.-C. power from said source, a second source of synchronizing voltage, means for applying a synchronizing voltage from said second source to said second power tube so as to produce a cyclically varying power output therefrom, a vertical cathode ray beam deflection coil connected to receive the power output of said second power tube, and a circuit for connecting said pair of energy-storage devices to said first-mentioned power tube additively and said second power tube in series both with each other and with said source of D.-C. power.

7. A cathode ray beam deflection system in accordance with claim 6, further comprising means for varying the amount of energy stored by each of said pair of energy-storage devices.

8. A cathode ray beam deflection system in accordance with claim 6, further comprising a pair of adjustable impedance elements respectively shunting said pair of energy-storage devices.

9. In a television system, a cathode ray tube, a source of D.-C. power, means for converting D.-C. power from said source into A.-C. power of a substantially predetermined frequency, a pair of line deflection coils for said cathode ray tube, each of said pair of line deflection coils being connected to receive a portion of the A.-C. power output of said converting means, a pair of diodes, a pair of condensers, means connecting one of said diodes and one of said condensers in series across one of said line deflection coils so that said one diode will rectify a portion of the reactive energy developed across said one cathode ray beam deflection coil, means connecting the other of said diodes and the other of said condensers in series across the other of said line deflection coils so that said other diode will rectify a portion of the reactive energy developed across said other cathode ray beam deflection coil, further means for converting D.-C. power from said source into A.-C. power of a different substantially predetermined frequency from that of the A.-C. power output of said first-mentioned converting means, a field deflection coil for said cathode ray tube, said field deflection coil being connected to receive the A.-C. power output of said further converting means, and a circuit for connecting said pair of condensers to each of said converting means additively in series both with each other and with said D.-C. source.

10. A television system in accordance with claim 9, in which each of said converting means includes at least one power output tube, and in which said means for connecting said pair of condensers to each of said converting means additively in series both with each other and with said D.-C. source includes a connection between one of said condensers and the anode of the power output tube of each of said converting means.

11. In a cathode ray beam deflection circuit of the type in which a power output tube energized from a source of D.-C. power is adapted to deliver cyclically varying current, a portion of each cycle of which varies in a substantially linear manner with respect to time, to a pair of cathode ray beam deflection coils through a coupling transformer, and in which said coupling transformer is provided with at least two secondary windings each of which is connected to deliver current to one of said cathode ray beam deflection coils, the combination of a pair of rectifiers, a pair of energy-storage devices respectively connected in series with said pair of rectifiers, means for connecting each series combination of rectifier and energy storage-device respectively across one of the two secondary windings of said transformer, whereby said pair of energy-storage devices are caused to become charged, and means for applying the charge on each of said energy-storage devices to said power output tube additively in series both with each other and with said source of D.-C. power, thereby to increase the output of said power output tube.

CHARLES EDWARD TORSCH.

REFERENCES CITED

The following references are of record in the file of this patent:

UNITED STATES PATENTS

| Number | Name | Date |
|---|---|---|
| 2,074,495 | Vance | Mar. 23, 1937 |
| 2,212,217 | White | Aug. 20, 1940 |
| 2,278,431 | Klemperer | Apr. 7, 1942 |

FOREIGN PATENTS

| Number | Country | Date |
|---|---|---|
| 548,618 | Great Britain | Oct. 16, 1942 |